US012578232B2

(12) United States Patent
Yu et al.

(10) Patent No.: US 12,578,232 B2
(45) Date of Patent: Mar. 17, 2026

(54) THERMAL IMAGING DEVICE

(71) Applicant: Rayprus Technology (Foshan) Co., Ltd., Foshan (CN)

(72) Inventors: Hsiang-Chieh Yu, NewTaipei (TW); Cheng-Yuan Shih, NewTaipei (TW)

(73) Assignee: Rayprus Technology (Foshan) Co. Ltd., Foshan (CN)

( * ) Notice: Subject to any disclaimer, the term of this patent is extended or adjusted under 35 U.S.C. 154(b) by 190 days.

(21) Appl. No.: 18/383,115

(22) Filed: Oct. 24, 2023

(65) Prior Publication Data

US 2024/0344889 A1    Oct. 17, 2024

(30) Foreign Application Priority Data

Apr. 12, 2023    (CN) .......................... 202310390913.8

(51) Int. Cl.
| | |
|---|---|
| *G01J 5/20* | (2006.01) |
| *G01J 4/04* | (2006.01) |
| *G02B 27/28* | (2006.01) |
| *G01J 5/00* | (2022.01) |

(52) U.S. Cl.
CPC . *G01J 5/20* (2013.01); *G01J 4/04* (2013.01); *G02B 27/283* (2013.01); *G01J 2005/0077* (2013.01)

(58) Field of Classification Search
CPC ........ G01J 5/20; G01J 4/04; G01J 2005/0077; G01J 5/48; G02B 27/283; G02B 27/286
See application file for complete search history.

(56) References Cited

U.S. PATENT DOCUMENTS

| | | | |
|---|---|---|---|
| 2013/0286190 A1 | 10/2013 | Xin | |
| 2015/0171516 A1* | 6/2015 | Chen ....................... | H02J 50/23 |
| | | | 342/368 |
| 2021/0263194 A1* | 8/2021 | Schnee .................. | G02B 1/002 |
| 2022/0228918 A1 | 7/2022 | Busnaina et al. | |

FOREIGN PATENT DOCUMENTS

| | | | |
|---|---|---|---|
| CN | 103376159 | 10/2017 | |
| CN | 113655549 | 11/2021 | |
| CN | 114843298 | 8/2022 | |
| CN | 115200718 | 10/2022 | |
| WO | WO-2022017199 A1 * | 1/2022 | ............. G02B 1/002 |

OTHER PUBLICATIONS

Zhang, Y., Pu, M., Jin, J., Lu, X., Guo, Y., Cai, J., . . . & Luo, X. (2022). Crosstalk-free achromatic full Stokes imaging polarimetry metasurface enabled by polarization-dependent phase optimization. Opto-Electronic Advances, 5(11), 220058-1.

* cited by examiner

*Primary Examiner* — Kiho Kim
(74) *Attorney, Agent, or Firm* — ScienBiziP, P.C.

(57) ABSTRACT

A thermal imaging device includes a metalens and a thermal image sensor. The metalens is configured to adjust incident light into beams of polarized light having different polarization directions, and to converge and emit the beams of polarized light. The thermal image sensor is on an output side of the metalens. The thermal image sensor is configured to receive the beams of polarized light having different polarization directions and construct a polarization image.

14 Claims, 5 Drawing Sheets

100

100

P1(S0)

P2(DoLP)

THERMAL IMAGING DEVICE

FIELD

The subject matter herein relates to a field of infrared detection technology, particularly relates to a thermal imaging device.

BACKGROUND

The polarized light technology is widely applied in the field of industrial detection and concentrated in the visible and near-infrared wavelength range. For example, calculating polarization direction to increase contrast during low illumination environment detection, reducing interference of reflected stray light during surface of transparent objects during stress detection. The polarized light technology applied in the field of thermal imaging mostly adopts wavelength range of the mid infrared or the far infrared, which detects the infrared radiation intensity emitted by the target object, converts it into temperature information, and generates real-time thermal images. However, there are still some technical issues that need to be addressed in the application process of far infrared thermal imaging.

Traditional thermal imaging devices lack comparison in the detection results of areas having uniform distribution of light radiation intensity during the imaging process, resulting in blurring of the area in the image. Traditional thermal imaging devices also lack spatial resolution at junctions of different regions having significant differences in light radiation intensity, resulting in blurry boundaries between regions with different light radiation intensities in the image. Thus, in final image, its resolution is insufficient to recognize target features, such as facial features. In the end, the imaging results are prone to have a blurry or poor contrast, making it difficult to clearly identify the target object, thereby reducing detection accuracy and efficiency.

Therefore, there is room for improvement in the art.

BRIEF DESCRIPTION OF THE DRAWINGS

Implementations of the present technology will now be described, by way of embodiments only, with reference to the attached figures.

DETAILED DESCRIPTION

Figure 1:
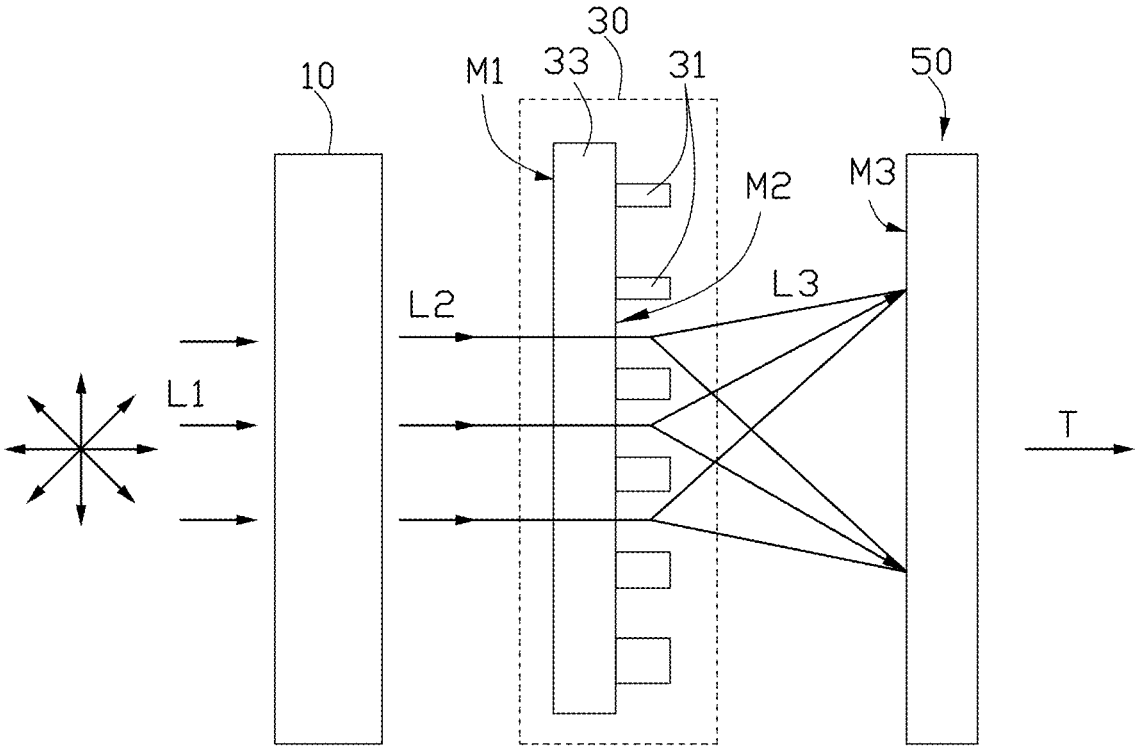
FIG. 1 is a schematic view of a thermal imaging device according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as coupled, whether directly or indirectly through intervening components, and is not necessarily limited to physical connections. The connection can be such that the objects are permanently coupled or releasably coupled. The term "comprising" when utilized, means "including, but not necessarily limited to"; it specifically indicates open-ended inclusion or membership in the so-described combination, group, series, and the like.

Figure 6:
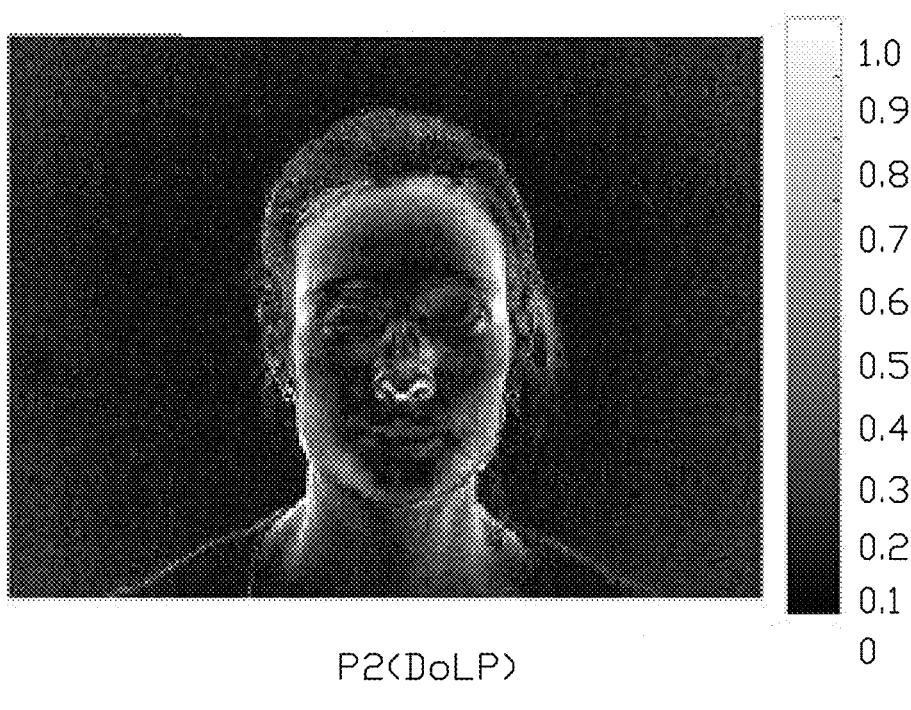
FIG. 6 shows a polarization image generated by the thermal image sensor in FIG. 1.

The present disclosure provides a thermal imaging device. As shown in FIG. 1, the thermal imaging device 100 includes a polarizer 10, a metalens 30, and a thermal imaging sensor 50. The polarizer 10 is used to convert beams of natural light L1 without polarization into beams of polarized light L2 having a same polarization direction. The polarizer 10 can be a linear polarizer, and beams of polarized light L2 having the same polarization direction are linearly polarized light. In other embodiments, the polarizer 10 can be other types of polarizers, and the beams of polarized light L2 having the same polarization direction being other types of polarized light, such as circularly polarized light, elliptically polarized light, or partially polarized light. The metalens 30 is arranged on an output side of the polarizer 10 to adjust beams of polarized light L2 having the same polarization direction to beams of polarized light L3 having different polarization directions, and converges on the thermal image sensor 50. In other embodiments, the metalens 30 can also be located on an input side of the polarizer 10. The thermal image sensor 50 is on an output side of the metalens 30 to receive beams of polarized light L3 having different polarization directions and construct a polarization image P2 as shown in FIG. 6.

In the present embodiment, the metalens 30 includes a substrate 33 and a plurality of transmission units 31 at nanoscale. The transmission units 31 are spaced apart from each other and on a surface of the substrate 33, wherein the surface of the substrate 33 can be either an input surface M1 of the substrate 33 facing away the thermal image sensor 50 or an output surface M2 of the substrate 33 facing the thermal image sensor 50. In other embodiments, the input surface M1 and the output surface M2 can be exchanged. That is, the input surface M1 is facing the thermal image sensor 50, and the output surface M2 is facing away the thermal image sensor 50. Each transmission unit 31 is a column in shape. The transmission units 31 can allow the polarized light L2 to pass through and undergo a phase delay $\pi$. That is, the propagation distance of the polarized light L2 delays $\lambda/2$, about one half of the wavelength of the polarized light. The linearly polarized light can still remain linearly polarized after a phase delay of $\pi$, but the polarization direction changes.

Multiple beams of polarized light L2 having the same polarization direction pass through the different transmission units 31, and multiple beams of polarized light L3 having different polarization directions are obtained. The transmission units 31 and the substrate 33 are made of a material have a good transmittance for light having an infrared band range applicable to this embodiment. Optionally, the metalens 30 can be made of monocrystalline silicon (Si). The metalens 30 can be made by etching a monocrystalline silicon substrate (equivalent to substrate 33) to form an optical structure array (equivalent to an array of transmission units 31) having a subwavelength scale. The monocrystalline silicon has a refractive index of 3.4, and a transmittance of infrared light having a wavelength range of 8 μm~14 μm of approximately 50%, which can play a preliminary role in selecting infrared wavelength range, allowing most of the light within a target infrared wavelength range to pass through while blocking light in other wavelength ranges. In other embodiments, the metalens 30 can also be made of germanium (Ge).

In this embodiment, the transmission units 31 of the metalens 30 are arranged on the output surface M2 of the substrate 33. Moreover, at least one of a height, a cross-sectional shape, a cross-sectional area, an inclination direction, and an inclination angle of each transmission unit 31 distributed on the substrate 33 are different. A center distance between any two adjacent transmission units 31 is not exactly the same. However, the surface of substrate 33 can be divided into a plurality of predetermined regions, and a distribution of the transmission units 31 in the same region follows the same design rules. Specifically, when a plurality of beams of polarized light L2 having the same polarization direction pass through a certain region of the metalens 30, the polarization direction of the polarized light rotates at a common angle and changes. The polarization direction of the polarized light L3 emitted from different regions is also different. At the same time, the emission direction of the polarized light L3 is affected by the inclination direction of the transmission units 31. Finally, all of the polarized light L3 is focused on the thermal image sensor 50 under action of the metalens 30.

In other embodiments, the transmission units 31 are located on the input surface M1 of the substrate 33. Correspondingly, the height, the cross-sectional shape, the cross-sectional area, the inclination direction, and the inclination angle of the transmission units 31 need to be redesigned, and the distance between centers of each adjacent two transmission units 31 also needs to be redesigned. If the height, the cross-sectional shape, the cross-sectional area, the inclination direction, and the inclination angle of the transmission units 31 of the metalens 30 are designed with different parameters, and if the center distance between each adjacent two transmission units 31 is designed with different parameters, an effective focal length and field of view angle of the metalens 30 are also different.

Figure 2:
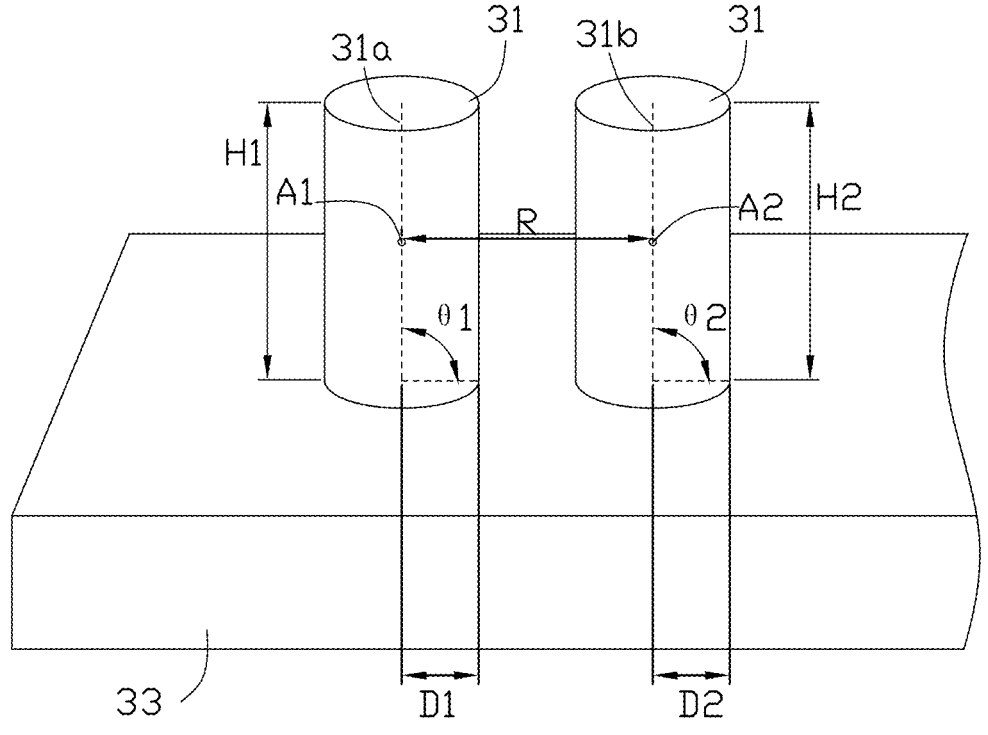
FIG. 2 is a schematic view of a portion of a metalens in FIG. 1.

Specifically, a shape of each transmission unit 31 can be cylinder, cube, frustum, etc. based on different cross-sectional shapes (such as circular, triangular, quadrilateral, cross shaped, etc.), and the cross-sectional area of each transmission unit 31 can also be different. For example, as shown in FIG. 2, each transmission unit 31 has a shape of cylinder, and the two transmission units 31 can have different radii D1 and D2, and a same height H1 and height H2. A diameter of each transmission unit 31 can be in a range from 1 μm to 3 μm. For example, the height H1 can be 5 μm. The distance between the centers A1 and A2 of the two transmission units 31 is R. The two transmission units 31 can incline in different directions relative to the substrate 33, and an angle θ1 between a vertical axis 31a of one transmission unit 31 and the surface of the substrate 33 (such as the light input surface M1) may be different from an angle θ2 between a vertical axis 31b of the other transmission unit 31 and the surface of the substrate 33. If the transmission unit 31 is vertically protruded from the substrate 33, the angle θ1 is 90°. That is, the vertical axis 31a is perpendicular to the surface of substrate 33. In this embodiment, the angle θ1, the angle θ2, and an angle between each of the other transmission units 31 and the substrate 33 is 90°.

In other embodiments, in order to prevent interference from stray light in other wavelength ranges and achieve better incident effects, a surface of the polarizer 10 or a flat surface of the metalens 30 can be covered with an anti-reflective film (not shown). The anti-reflective film can allow infrared light to pass through. Alternatively, a band-pass filter (not shown) that only allows infrared light to pass through between the polarizer 10 and the metalens 30 can be set.

Figure 3:
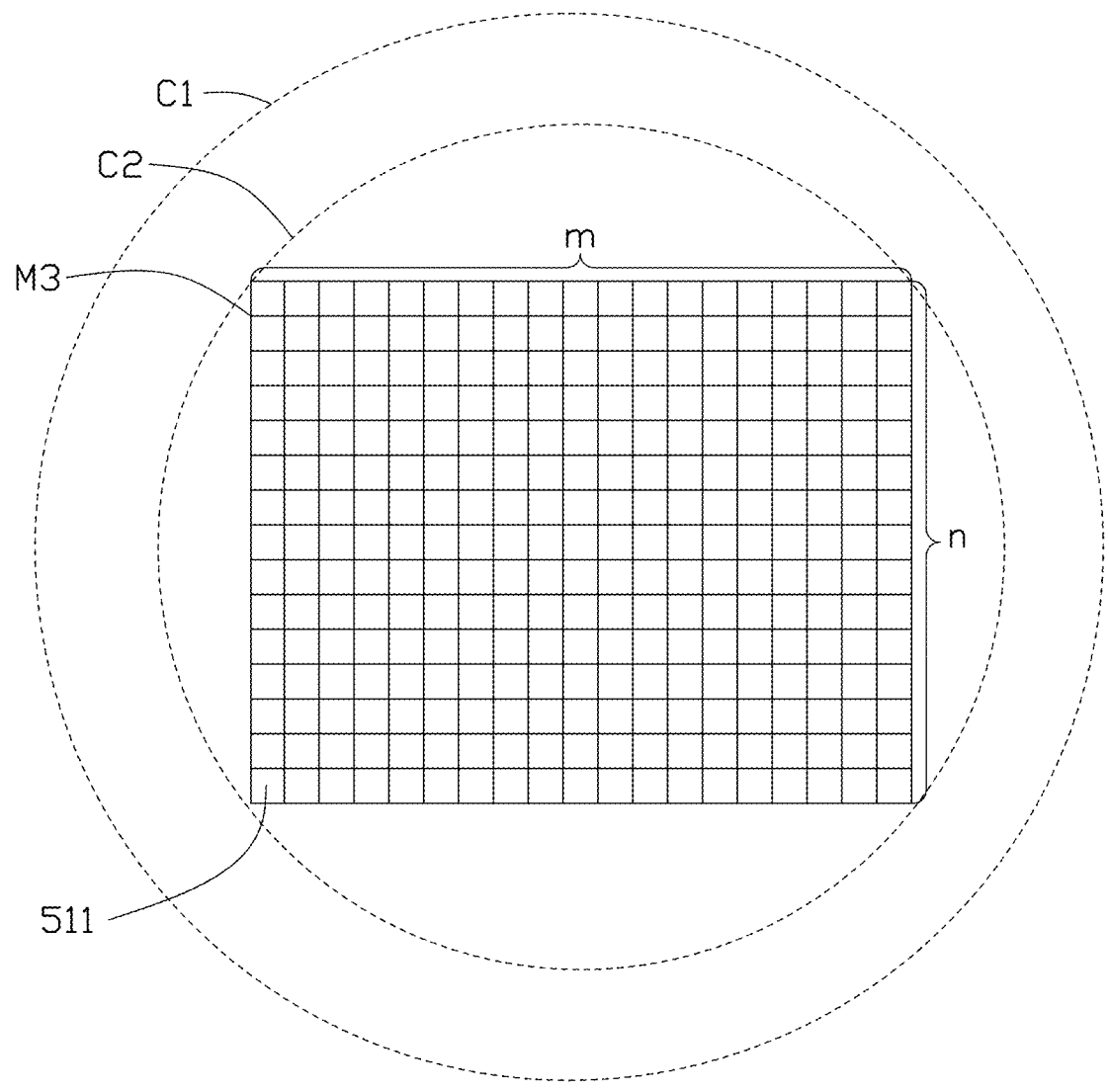
FIG. 3 is a side view of an image plane of a thermal image sensor in FIG. 1.
Figure 4:
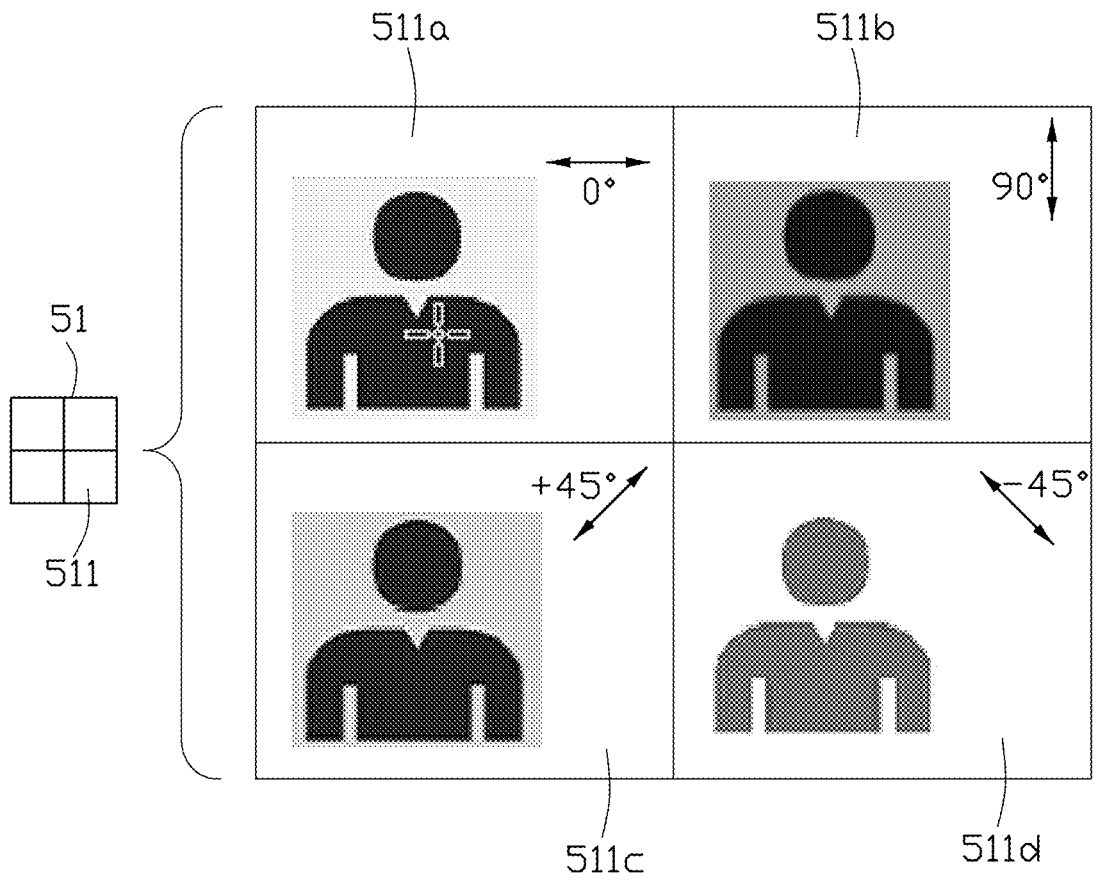
FIG. 4 is a schematic view of a portion of a pixel group of the thermal image sensor in FIG. 1.

In this embodiment, a surface of the thermal image sensor 50 that used to receive the polarized light L3 is an image plane M3. There is a plurality of pixel groups 51 in nanometer level on the image plane M3, and each pixel group 51 includes a plurality of sub-pixels 511 as shown in FIG. 4. Moreover, the polarization direction of the polarized light L3 received by each sub-pixel 511 is different. Before being received by the sub-pixel 511 on the thermal image sensor 50, beams of the polarized light L3 undergo vector superposition and focus on one sub-pixel 511. In additional, in each pixel group 51, the polarization direction of the polarized light received by each sub-pixel 511 is orthogonal to the polarization direction of the polarized light received by another sub-pixel 511. The sub-pixels 511 is usually arranged in a matrix, which can form a n×m matrix as shown in FIG. 3. That is, the matrix includes m columns and n rows, wherein m≥1 and n≥1. The thermal image sensor 50 then calculates and processes received polarized light L3. Based on the spatial light intensity distribution of incident beams of polarized light L3, by calculating three components S0, S1, and S2 of the stokes vector $\vec{S}$ for each pixel group 51, the degree of linear polarization (DoLP) for each pixel group 51 can be further calculated, which is a ratio of intensity of the linearly polarized light to intensity of the entire polarized light.

For example, as shown in FIG. 4, a 2×2 pixel group 51 includes four sub-pixels that are a sub-pixel 511a, a sub-pixel 511b, a sub-pixel 511c, and a sub-pixel 511d. The polarization direction of the polarized light L3 received by each sub-pixel 511 is different, wherein the sub-pixel 511a receives the polarized light L3 having a polarization angle of 0°, the sub-pixel 511b receives the polarized light L3 having a polarization angle of 90°, the sub-pixel 511c receives the polarized light L3 having a polarization angle of +45°, and the sub-pixel 511d receives the polarized light L3 having a polarization angle of −45°. From this, it can be seen that the polarization directions of the polarized light L3 received by the sub-pixel 511a and the sub-pixel 511b are orthogonal to each other, and the polarization directions of the polarized light L3 received by the sub-pixel 511c and the sub-pixel 511d are orthogonal to each other. By using I(0), I(90), I(+45), and I(−45) to represent the light intensity of the polarized light L3 received by the four sub-pixels 511, the Stokes vector $\vec{S}$ of the pixel group 51 can be calculated. The Stokes vector $\vec{S}$ is a mathematical representation of the polarized light, which can be written as following formals (1) and (2).

$$\vec{S} = [S0, S1, S2, S3] \tag{1}$$

$$S0^2 = S1^2 + S2^2 + S3^2 \tag{2}$$

S0 represents a total incident light intensity of one pixel group 51, S1 represents a difference in polarized light intensity between a 0° component (which can be considered a x-axis of the light vector) and a 90° component (which can be considered a y-axis of the light vector), S2 represents a difference in light intensity between the +45° polarized component and the −45° polarized component, and S3 represents a difference in light intensity between a left-handed circularly polarized component and a right-handed circularly polarized component.

If the polarized light is completely linearly polarized light, then the component S3 of the stokes vector $\vec{S}$ is 0, which satisfies:

$$\vec{S} = [S0, S1, S2] \tag{3}$$

$$S0^2 = S1^2 + S2^2 \tag{4}$$

In this embodiment, the three components S0, S1, and S2 of the stokes vector $\vec{S}$ can be calculated by the following formulas (5), (6) and (7).

$$S0 = I(0) + I(90) \tag{5}$$

$$S1 = I(0) - I(90) \tag{6}$$

$$S2 = I(+45) - I(-45) \tag{7}$$

Further the degree of linear polarization (DoLP) can be calculated by following formula (8).

$$DoLP = \frac{\sqrt{S1^2 + S2^2}}{S0} \tag{8}$$

In the above formulas, the units of each of S0, S1, and S2 is w/(sr·cm²).

In this embodiment, a value of DoLP is between 0 and 1, wherein the value of DoLP can be 1 or 0. If the four components I(0), 1(90), I(+45), and I(−45) satisfy I(0)=I(90) and I(+45)=I(−45), then S1=S2=0, and the value of DoLP is 0. If the polarization direction of all of the polarized light is 0°, it indicates that the value of each of the components I(90), I(+45), and I(−45) is 0, and the value of I (0) is not equal to 0, and S1=S0, the value of DoLP is 1.

A linear degree of polarization can be calculated for each pixel group 51. The greater the value of the DoLP, the greater the difference between light intensity of linearly polarized light components of the sub-pixel 511a and the sub-pixel 511b (the sub-pixels 511c and the sub-pixel 511d, etc.) with orthogonal polarization directions in the pixel group 51. When the value of the DoLP approaches 1, it indicates that almost only one of the polarization directions has linearly polarized light. The less the value of the DoLP, the less the difference between light intensity of linearly polarized light components of the sub-pixel 511a and the sub-pixel 511b (the sub-pixels 511c and the sub-pixel 511d, etc.) with orthogonal polarization directions in the pixel group 51. When the value of the DoLP approaches 0, it indicates that almost all polarization directions have linearly polarized light with equal intensity.

Figure 5:
FIG. 5 shows a light radiation intensity image generated by the thermal image sensor in FIG. 1.

FIG. 5 shows a light radiation intensity image P1 generated according to the value of S0 in each pixel group 51 when the thermal imaging device 100 is used for facial recognition. The unit of S0 in FIG. 5 is w/(sr·cm²). The higher the radiation intensity of the linearly polarized light, the greater the value of S0, the brighter in FIG. 5. The lower the radiation intensity of the linearly polarized light, the less the value of S0, the darker in FIG. 5.

FIG. 6 shows a polarization image P2 generated according to the value of DoLP in each pixel group 51 when the thermal imaging device 100 is used for facial recognition. The greater the difference between the light radiation intensity of linearly polarized light of each sub-pixel, the greater the DoLP value, the brighter in FIG. 6. The less the difference between the light radiation intensity of linearly polarized light of each sub-pixel, the less the DoLP value, the darker in FIG. 6. It can be clearly seen that, compared to FIG. 5, FIG. 6 magnifies differences in S0 of each pixel group 51. Specifically, for areas with relatively uniform distribution of light intensity such as forehead skin and hair on the of a human face, the corresponding DoLP value is relatively less, and the above areas shown in the FIG. 6 tend to be dark. For junction areas between the skin and hair, the intensity of light changes significantly, the corresponding DoLP value is relatively greater, and hairline areas in FIG. 6 tend to be white and bright. Therefore, compared to the light radiation intensity image P1, the polarization image P2 has a higher image contrast and clearer detailed features. Finally, the thermal image sensor 50 synthesizes a thermal image T containing DoLP information by fusion calculation of the four polarization direction components mentioned above.

In this embodiment, beams of the polarized light L3 having different polarization directions transmitted by transmission units 31 will be vector superimposed before reaching the sub-pixels 511 of the image plane M3. At the same time, in order to ensure that each sub-pixel 511 at edge position can receive a beam of superimposed polarized light L3, a number of transmission units 31 of the metalens 30 is greater than a number of sub-pixels 511 of the thermal image sensor 50. When making the metalens 30, it is generally necessary to first fix the array of sub-pixels 511, and then adjust the number and arrangement rules of transmission units 31 based on the position of each sub-pixel 511. As shown in FIG. 3, there is an imaging area C1 when the metalens 30 is imaged on the image plane M3, and a size of the imaging area C1 is determined by the effective focal length and field of view angle of the metalens 30 is applied. At the same time, there is also a sensing area C2 on the image plane M3 of the thermal image sensor 50. A size of the sensing area C2 is determined by the size of the image plane M3, and a maximum diameter of the sensing area C2 is equal to a diagonal of the array of the sub-pixels 511 on the image plane M3. To ensure a better imaging effect, a size of the imaging area C1 should be greater than a size of the sensing area C2 to prevent black shadows and edge blurring.

The thermal imaging device 100 in the present disclosure is used to detect optical signal radiated by a target object and generate a thermal image T by analyzing the optical signal, and enhance contrast of the thermal image. The thermal imaging device 100 replaces the complex and expensive lens modules in traditional thermal imaging systems by using a metalens 30, which has advantages of better imaging and easier integration. By adjusting the height, the cross-sectional shape, the cross-sectional area, the inclination direction, and inclination angle of the transmission units 31 of the metalens 30, the incident light is adjusted to beams of the polarized light L3 with different polarization directions, and converged and emitted. Further, the thermal image sensor 50 uses the DoLP algorithm to process received polarized light L3, and generate a polarization image P2, which increases the contrast of the image during the thermal imaging process, making the imaging effect clearer and achieving better detection results when recognizing the characteristics of the object.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A thermal imaging device comprising:
a metalens configured to adjust incident light into beams of polarized light having different polarization directions, and to converge and emit the beams of polarized light; and
a thermal image sensor on an output side of the metalens, the thermal image sensor configured to receive the beams of polarized light having different polarization directions and construct a polarization image;
wherein the metalens comprises a substrate and a plurality of transmission units at nanoscale on the substrate, the plurality of transmission units is spaced apart from each other, each of the plurality of transmission units is a column in shape, and the plurality of transmission units is on a surface of the substrate facing away the thermal image sensor.

2. The thermal imaging device of claim 1, wherein the plurality of transmission units is on a surface of the substrate facing the thermal image sensor.

3. The thermal imaging device of claim 1, wherein the metalens allows the incident light to pass through and undergo a phase delay.

4. The thermal imaging device of claim 1, wherein at least one of a height, a cross-sectional shape, a cross-sectional area, an inclination direction, and an inclination angle of each of the plurality of transmission units is different.

5. The thermal imaging device of claim 4, wherein a distance between centers of any adjacent two of the plurality of transmission units is not the same.

6. The thermal imaging device of claim 1, wherein the thermal image sensor comprises a plurality of pixel groups in nanometer level, each of the plurality of pixel groups comprises a plurality of sub-pixels, a polarization direction of the beams of polarized light received by each of the plurality of sub-pixels is different.

7. The thermal imaging device of claim 6, wherein in each of the plurality of pixel groups, the polarization direction of the beams of polarized light received by each of the plurality of sub-pixels is orthogonal to the polarization direction of the beams of polarized light received by another one of the plurality of sub-pixels.

8. The thermal imaging device of claim 7, wherein the plurality of sub-pixels in each of the plurality of pixel groups comprises a first sub-pixel for receiving polarized light having a polarization angle of 0°, a second sub-pixel for receiving polarized light having a polarization angle of 90°, a third sub-pixel for receiving polarized light having a polarization angle of 45°, and a fourth sub-pixel for receiving polarized light having a polarization angle of −45°.

9. The thermal imaging device of claim 7, wherein a number of the plurality of transmission units of the metalens is greater than a number of sub-pixels in the thermal image sensor.

10. The thermal imaging device of claim 6, wherein the thermal image sensor is used to calculate a linear polarization degree by calculating a stokes vector of the beams of polarized light having different polarization directions received by the plurality of pixel groups, and obtain the polarization image.

11. The thermal imaging device of claim 1, further comprising a polarizer, wherein the polarizer is used to convert beams of natural light without polarization into beams of polarized light having a same polarization direction.

12. The thermal imaging device of claim 11, wherein the polarizer is on a side of the metalens facing away the thermal image sensor.

13. The thermal imaging device of claim 1, wherein the metalens is made of monocrystalline silicon.

14. The thermal imaging device of claim 1, wherein the metalens is made of germanium.

* * * * *